Sept. 22, 1959 C. M. PHILLIPS 2,905,748
COLOR BURST SEPARATOR
Filed March 30, 1953
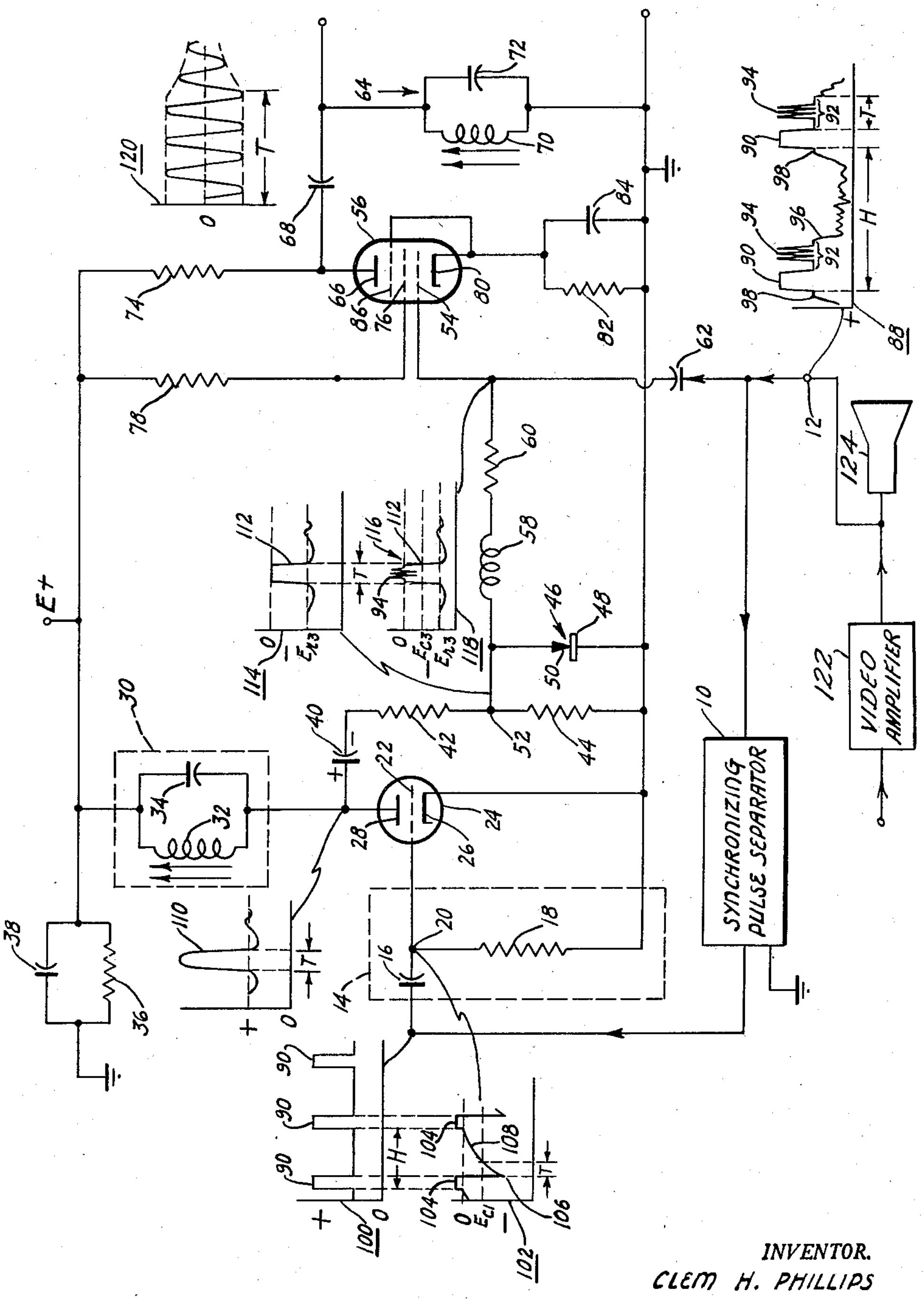
INVENTOR.
CLEM H. PHILLIPS
BY
Allen V. Hazeltine
ATTORNEY 2,905,748
Patented Sept. 22, 1959

2,905,748

COLOR BURST SEPARATOR

Clem H. Phillips, Philadelphia, Pa., assignor to Philco Corporation, Philadelphia, Pa., a corporation of Pennsylvania Application March 30, 1953, Serial No. 345,307

16 Claims. (Cl. 178—5.4)

This invention relates to electrical systems and more particularly, to improved circuits for selecting a desired recurrent component from a composite wave. Such circuits are especially adapted for use in color television systems for separating, from the composite video signal, a marker signal serving as the color synchronizing signal, and it is with respect to this use that the invention is specifically described herein.

In a typical case, the composite video signal may comprise horizontal and vertical synchronizing signals, a color video wave and a marker signal for providing a phase reference for the color-establishing component of the video wave. In practice, the horizontal and vertical synchronizing signals are in the form of time-spaced pulses recurrent respectively at the horizontal and vertical scanning frequencies of the image to be reproduced. The color video wave occurs during the intervals between the horizontal pulses and may comprise a brightness or monochrome component having a frequency spectrum extending, for example, from 0 to 3.5 mc./sec., and a color-establishing or chromaticity component in the form of a modulated subcarrier wave having a nominal frequency located at the high-frequency and of the frequency spectrum of the monochrome component. The marker signal may be in the form of a burst of a small number of cycles of carrier signal having a frequency equal to the nominal frequency of the chromaticity subcarrier component of the color video wave and occurring during the so-called back-porch interval of the horizontal scanning pulses.

The marker or burst signal may be used to establish the phase of the chromaticity component of the video signal at the television receiver in any one of several manners. For example, the burst signal may be applied to a phase detector together with a wave derived from a local sampling-wave generator operating at substantially the same frequency as that of the burst signal and serving as a source of a demodulation signal for the chromaticity subcarrier component of the color video wave. In such a system an output signal proportional to the difference in phase between the burst signal and the sampling wave is derived from the phase detector and serves to control the frequency and phase of the sampling-wave generator.

Alternatively, the burst signal may be supplied directly to a local sampling-wave generator so as to lock the generator in synchronism with the burst signal.

In either case, in order to prevent erroneous color values in the image reproduced on the cathode-ray tube screen of the receiver, it is essential that the phase of the separated burst signal bear a known predetermined relationship to the phase of the burst signal originally appearing in the composite video signal. Furthermore, the separated burst signal should be free from spurious signals, such as thermal noise signals generated within the receiver or impulsive noise signals picked up from sources external to the receiver, and particularly spurious signals occurring at times different from the time of occurrence of the burst signals.

In order to preclude the generation of spurious signals in the intervals between the burst signals, it has been proposed to derive the burst signal by means of a time-selective, i.e. time-gated system. Such a gated system is preferably energized by the horizontal synchronizing pulses since these pulses bear a fixed relationship to the position of the burst signal.

In one proposed arrangement for utilizing the horizontal synchronizing pulses as a source of a gating signal, the synchronizing pulses are applied as a triggering signal to a delay multivibrator thereby to cause the generation of gating pulses in time coincidence with the burst signals. In practice, however, it has been found that the timing and the amplitude of the waveforms generated by multivibrators are notoriously sensitive to changes in the energizing voltages supplied thereto. Hence changes in A.-C. line voltage normally encountered at the receiver location are likely to affect the operating potentials supplied to the multivibrators to an extent such as to make unreliable the gating signals generated thereby.

In another proposed arrangement, the horizontal synchronizing pulses themselves serve as the gating signal. In order to use the synchronizing pulses in this manner, however, these pulses must be supplied to the gated system through a delay line in order that the gating time shall coincide with the occurrence of the burst signal. Because of the relatively high cost of delay lines and because the termination of the line must be critically adjusted in order to avoid distortion of the given pulse and the generation of spurious pulses, delay lines are relatively undesirable circuit components when other means for accomplishing their function are available.

Accordingly it is an object of the invention to provide an improved circuit for selecting a desired recurrent component from a composite wave.

Another object of the invention is to provide improved gating means for selecting a marker signal component from an applied composite video signal.

A further object of the invention is to provide an improved burst-separating system in which spurious signals are substantially rejected.

An additional object of the invention is to provide an improved burst-separating system in which the phase of the output signal of the system has a predetermined relationship with respect to the phase of the burst signal.

Still another object of the invention is to provide an improved burst-separating system in which a gating signal therefor is derived from the horizontal synchronizing pulses by simple, reliable means.

A specific object of the invention is to provide an improved burst-separating system, exhibiting excellent rejection of spurious signals, for producing an output signal which bears a predetermined phase relationship to the applied burst signal, and incorporating simple and ingenious means for deriving the gating signal from the horizontal synchronizing pulses.

In accordance with the invention, the foregoing objects are achieved by providing an electrical system comprising means responsive to the horizontal sychronizing pulses for generating sinusoidal pulses having a repetition rate equal to the repetition rate of the horizontal synchronizing pulses. The duration of the sinusoidal pulses is made substantially equal to the duration of the back porch interval of the horizontal synchronizing pulses and is made time-coincident with the color burst signal. The system of the invention further embodies means for amplitude-limiting the generated pulses, thereby to convert the same into gating pulses having a gating interval equal to or slightly greater than the duration of the burst signals and time-coincident therewith. The system of the invention additionally comprises a gate-actuated transmission channel to which the composite video signal is applied and which is actuated by the aforesaid gating pulses.

In a preferred form of the invention, the burst-separating system comprises pulse-generating means embodying an electrical network having a parallel-resonant frequency substantially equal to one-half of the reciprocal of the back-porch interval of the horizontal synchronizing pulses, and adapted to be energized and damped by a switching tube operating in synchronism with the horizontal synchronizing pulses. The switching tube is controlled by a differentiating network having a time constant selected in a manner such that, in response to the trailing edge of each horizontal synchronizing pulse supplied to the differentiating circuit, the switching tube is maintained in a cut-off condition for a time interval substantially equal to the aforementioned back-porch interval. The system further comprises an amplitude-limiting means for converting the signal produced by the parallel resonant circuit into a pulse signal having a predetermined peak-to-peak value, and a gate-actuated transmission channel energized by the pulse signal and serving to derive selectively the marked signal from the composite video signal.

The invention will be described in greater detail with reference to the appended drawing forming part of the specification, the single figure of which is a schematic circuit diagram of the preferred embodiment of the invention.

Referring to the drawing, the system there shown comprises a synchronizing pulse separator 10 which is connected to an input terminal 12, and which is of conventional form and may comprise an amplitude-selective transmission path having a pass band terminating at a given maximum frequency. The synchronizing pulse separator 10 is coupled to a differentiating network 14 which, in the arrangement shown, comprises a capacitor 16 and a resistor 18 connected in series relationship. The junction 20 of the resistor-capacitor network 16—18 is coupled to the control electrode 22 of a switching tube 24 which tube also comprises a cathode 26, connected to a point at ground potential, and an anode 28 coupled to a source of positive potential at E+ through a load impedance 30. The latter load impedance is constituted by an inductor 32 shunted by a capacitor 34, and is adjusted to be parallel-resonant at a frequency to be specified hereinafter. In the preferred arrangement, the inductor 32 may be provided with an adjustable ferromagnetic core, while the capacitor 34 may consist wholly, or in part, of the distributed capacitance of the inductor 32.

A resistor-capacitor filter 36—38, is coupled to the source E+ and to a point at ground potential, as shown, to provide a low impedance shunting path for A.-C. signals.

The output circuit of switch tube 24 is shunted by an amplitude-limiting circuit comprising a capacitor 40 coupled to the anode 28 of tube 24, resistors 42 and 44 connected in series relationship with the capacitor 40 with one end of resistor 44 connected to a point at ground potential, and a rectifier 46 having a cathode 48 coupled to a point at ground potential and an anode 50 connected to the junction 52 of resistors 42 and 44. The amplitude-limiting circuit, in turn, supplies the control electrode 54 of a gating tube 56 through a series-connected network comprising an inductor 58 and a resistor 60. The control electrode 54 is further coupled to the input terminal 12 through a capacitor 62. The tube 56, shown in the form of a pentode, is provided with a load impedance 64 coupled to the anode 66 thereof through a blocking capacitor 68, and comprising an inductor 70 and a capacitor 72. The load impedance 64 is adjusted to be parallel-resonant at a frequency to be specified hereinafter. The anode 66 of tube 56 is energized from the source E+ through an anode resistor 74, while the screen electrode 76 is supplied from the source E+ through a dropping resistor 78. For establishing the operating bias of the tube 56, the cathode 80 thereof is coupled to a point at ground potential through a resistor-capacitor biasing network 82—84. The suppressor electrode 86 may be connected to the cathode 80 of the tube.

In operation, there is supplied to the input terminal 12 an input wave consisting of a composite video signal having the general form shown at 88 and comprising a first component, consisting of horizontal synchronizing pulses 90, and a second component consisting of oscillatory bursts 94 serving as the color marker signal for establishing the phase of the color information contained in the color video wave 96 of the input signal. As is well understood, the composite video signal is derived by demodulation and is supplied to the usual video amplifier 122 which is conductively connected to the usual picture signal reproducing tube 124.

More specifically, the composite video signal shown at 88 comprises the horizontal synchronizing pulse 90 which recur periodically at time intervals H, and which are superimposed on a black-level pedestal in well-known manner. This pedestal has a back-porch portion 92 which occurs immediately after the horizontal synchronizing pulses 90 and has a duration T. The image information constituting the color video wave 96 is located timewise between the trailing edge of the back-porch portion 92 and a front-porch portion 98 of the black-level pedestal, which front-porch portion immediately precedes the following synchronizing pulse 90. The marker signal 94, serving as the color synchronizing signal, is positioned on the back-porch portion 92 and has a duration less than T, as shown. This marker signal may be in the form of a burst of a small number of cycles of carrier signal having a frequency equal to the frequency of the chromaticity subcarrier component of the color video wave 96. In one arrangement the repetition rate of the horizontal synchronizing pulses 90 may be 15,750 pulses per second, while the frequency of the burst signal 94 may be 3,898,-125 cycles per second.

By means of the synchronizing pulse separator 10, the horizontal synchronizing pulses 90 are separated from the composite video signal shown at 88 to produce a signal of the form shown at 100. The separator 10 has a pass band limited to a maximum frequency of the order of 1 mc./sec. so as to allow substantially faithful and unattenuated transmission of the pulses 90 while severely attenuating the relatively high frequency burst signals 94.

When the leading edge of a synchronizing pulse 90, derived from the separator 10, is impressed upon the differentiating network 14, a positive-going output signal is produced which tends to swing the potential of the control electrode 22 positive with respect to the cathode 26. However, since the control electrode 22 is operated at substantially the potential of the cathode 26, such positive-going excursions of control electrode 26 are limited by the low-resistance shunting path existing between the cathode 26 and the control electrode 22.

When the trailing edge of the pulse 90 is applied to the differentiating circuit 14, a large, negative-going pulse is produced in response thereto at control electrode 22. Since, under these conditions, the cathode-control electrode path of the tube 24 has a high impedance, the aforesaid negative-going pulse is substantially unattenuated thereby. The wave-form produced at the control electrode 22 by the foregoing action of the differentiating network 14 and the cathode-control electrode path of tube 24 is shown at 102 wherein it will be seen that the positive-going portions of the output signal of network 14 are limited to the small positive pulses 104, while the negative-going portions of the aforesaid output signal are substantially unattenuated and correspond to the pulses 106 having an exponential decay as shown at 108.

The conduction in the anode-cathode path of tube 24, occurring at and slightly prior to the occurrence of the leading edge of the pulse 104, produces a signal pulse in the load impedance 30. However, because the tube 24 is in a conducting condition at this time, its anode-cathode path serves as a low-impedance shunt across the load impedance 30, damping and limiting the value of any oscillations produced therein. This shunting action is enhanced when the source of positive potential exhibits a low impedance, and, in the preferred arrangement, this low impedance is insured by the resistor-capacitor filter 36—38.

When the negative-going pulse 106, corresponding to the trailing edge of pulse 90, is applied to the control electrode 22, the tube 24 is suddenly cut off. This sudden cut-off of the tube 24 produces an oscillatory wave in the load impedance 30 which persists at a large amplitude during the period that the tube 24 remains in a cut-off condition.

In accordance with the invention, the wave generated across load impedance 30, and present at anode 28 of tube 24, is made to have a period of oscillation substantially equal to twice the back-porch interval T of the composite video signal shown at 88. Additionally the aforesaid oscillatory wave is heavily damped at the end of the interval T. As a consequence, a single, large-amplitude, positive-going pulse 110, in the form of a half-cycle of an oscillatory wave, is generated at the anode 28 in response to the aforesaid excitation produced by the cut-off of tube 24.

Such a single pulse of large amplitude is formed, in accordance with the invention, by constructing the network 30 so that it exhibits parallel resonance at a frequency substantially equal to 1/2T, where T, as aforementioned, is the duration of the back-porch portion 92 of the composite video signal shown at 88, and by constructing the differentiating network 14 with a time constant such that the tube 24 is maintained cut off, in response to the trailing edge of a pulse 90, for a time substantially equal to T, during which time the signal from the network 14 is more negative than the cut-off voltage of the tube 24. For a differentiating network of the form shown at 14, comprising the capacitor 16 and the resistor 18, the requisite values of the capacitor 16 and the resistor 18 for maintaining the tube 24 in a cut-off condition for the interval T in accordance with the invention are substantially interrelated by the mathematical equation:

$$RC=\frac{T}{\log_e (E/E_{c1})}$$

In the foregoing relationship, E is the peak-to-peak amplitude, measured in volts, of the horizontal synchronizing pulses 90 shown at 100, $E_{c1}$ is the value, measured in volts, of the cut-off potential of the tube 24, and RC is the product of the values of the capacitor 16 and the resistor 18, measured in farads and ohms, respectively.

The sinusoidal pulse 110, produced across the network 30, is amplitude-limited by means of the rectifier 46 and the resistor-capacitor network 40—42—44, thereby being converted into a substantially trapezoidal pulse signal 112 as shown at 114. The peak-to-peak amplitude value of the pulse signal 112 is determined, in well-known manner, by the values of the capacitor 40, the resistors 42 and 44 and the conduction impedance of the rectifier 46. Thus, as shown at 114 the top of the pulse 112 is established at substantially ground potential by the action of the rectifier 46, while the base of the pulse 112 is established at a negative reference level $E_{r3}$ by reason of the charging of capacitor 40 during the conduction intervals of rectifier 46. The aforementioned resistor-capacitor network, formed by capacitor 40 and resistors 42 and 44, is made to have a time constant long with respect to the interval between consecutive pulses 110 so that the voltage $E_{r3}$ is maintained substantially constant across the rectifier 46.

The pulse 112 is applied as a gating signal to the control electrode 54 of gating tube 56 through the inductor 58 and the resistor 60.

The composite video signal to be gated, shown at 88, is also supplied to the control electrode 54, preferably after having its low frequency components attenuated by the capacitor 62. This attenuation of the low frequency components of the signal at 88 is further facilitated by the network 58—60 which provides a low impedance path for low frequency signals between the control electrode 54 and a point at ground potential via the resistor 44 and the rectifier 46. Thus, substantially only the desired burst signal portion 94 of the composite video signal appears at the control electrode 54 of the gating tube 56.

The addition of the burst signal 94 to the trapezoidal pulse 112 produces, at the control electrode 54, a composite signal 116 shown at 118. Because of the negative level $E_{r3}$ of the signal shown at 118, the tube 56 is maintained in a cut-off condition between the occurrences of the composite signal 116. When the signal shown at 118 becomes more positive than the cut-off value of tube 56 (shown as $E_{c3}$) because of the pedestal 112 of composite signal 116, the tube 56 is rendered conductive so that the burst signal 94, superimposed on the pedestal 112, is gated into the output circuit of the tube 56 and appears across the load impedance 64. In the preferred arrangement shown, the bias supplied by the biasing network 90—92 serves to establish the cathode 80 at a voltage slightly positive with respect to ground potential, so that the voltage of control electrode 54 remains negative with respect to that of cathode 80 despite the positive-going voltage excursions of the burst signal 94 superimposed on the pedestal 112. In this way, distortion of the burst signal is prevented.

The load impedance 64 is tuned to the frequency of the burst signal 94. Consequently other signal components at the anode 66 of tube 56 not having the frequency of the burst signal, e.g., components due to the pedestal component 112 of the applied signal as well as spurious signals introduced by noise, are rejected substantially completely by the load impedance 64, so that the output signal is substantially a replica of the input burst component 94. In practice, the anode resistor 74 is given a relatively low value so that the tuned circuit 64 is damped and undesirable phase shifts of the derived burst signal are avoided.

At the termination of the pedestal component 112 of the signal 116, the tube 56 is once more cut off. The current in the tuned circuit 64, however, continues to oscillate, the amplitude of the output wave decreasing in a logarithmic manner as determined by the damping of the resonant circuit. The burst signal so derived (shown at 120 in an enlarged time scale for greater clarity) may be used for synchronizing the chromaticity subcarrier component of the color video signal in any of several well known manners, as aforedescribed.

While the invention has been illustrated in connection with a gating system in which the gating pulse and the marker signal are applied to a common control electrode of the gating tube, it should be well understood that these signals may equally well be applied to separate control electrodes of a multi-element electron discharge tube. In such an arrangement, the signal at 114, not having the burst signal 94 superimposed thereon, may be applied to a first control electrode of the tube so as to maintain the tube normally cut off except during the occurrence of the gating pulse 112, and the marker signal 94 may be applied to a second control electrode. Tubes suitable for use in this alternate arrangement are well known in the art and comprise for example, sharp cut-off pentodes and pentagrid tubes of the form commonly employed in frequency-converter systems.

While I have described my invention by means of specific examples and in a specific embodiment, I do not wish to be limited thereto, for obvious modifications will occur to those skilled in the art without departing from the spirit and scope of the invention.

What I claim is:

1. An electrical system responsive to an input wave having first and second components, the said first component comprising time-spaced periodically recurring pulses and the said second component comprising variations of the said wave having a given duration and recurring within a predetermined time interval following each of the said pulses, means for deriving the said pulses from the said input wave, means coupled to the said deriving means and responsive to the trailing edges of the said pulses for producing a control wave having variations within a given range during the said predetermined time interval and having variations outside of the said given range occurring substantially at the expiration of the said predetermined time interval, a network adapted to produce an oscillatory wave having a period substantially equal to twice the said predetermined time interval, means coupled to the said network and responsive to the said control wave for electrically exciting the said network when the variations of the said control wave fall within the said given range and for electrically damping the said network when the variations of the said control wave extend beyond the said given range, thereby to produce recurrent output pulses having a repetition rate equal to the repetition rate of the said pulses of the said first component, having a duration substantially equal to the said predetermined time interval and being time-coincident with the said predetermined time interval, a transmission channel normally closed in the absence of a gating signal applied thereto, means for supplying the said second component to the said channel, and means for supplying the said output pulses as a gating signal to the said channel.

2. An electrical system according to claim 1 wherein the said means for supplying the said output pulses to the said transmission channel comprises means intercoupling the said oscillatory network and the said channel and adapted to limit the excursions of said output pulses to a given value greater than that required to gate open said channel.

3. An electrical system according to claim 1 wherein the said means for producing the said control wave comprises a differentiating network.

4. An electrical system according to claim 1 wherein the said pulses of the said first component have a frequency spectrum limited substantially to a given maximum frequency value, wherein the said second component comprises a signal having a frequency within a given frequency range outside of the said spectrum of the said first component and wherein the said means for supplying the said second component to the said transmission channel comprises a filter having a pass band including the said given frequency range of the said second component and substantially excluding the said frequency spectrum of the said first component.

5. A burst-separating system responsive to a color television wave having first and second components, the said first component comprising time-spaced periodically recurring synchronizing pulses and the said second component comprising oscillatory bursts having a given frequency value and duration and recurring within a back-porch interval following each of the said synchronizing pulses, means for deriving the said synchronizing pulses from the said color television wave, means coupled to the said deriving means and responsive to the trailing edges of the said synchronizing pulses for producing a control wave having variations within a given range during the said back-porch interval and having variations outside of the said given range occurring substantially at the expiration of the said back-porch interval, a network adapted to produce an oscillatory wave having a period substantially equal to twice the said back-porch interval, means coupled to the said network and responsive to the said control wave for electrically exciting the said network when the variations of the said control wave fall within the said given range and for electrically damping the said network when the variations of the said control wave extend beyond the said given range, thereby to produce recurrent output pulses having a repetition rate equal to the repetition rate of the said synchronizing pulses, having a duration substantially equal to the said back-porch interval and being time-coincident with the said back-porch interval, a transmission channel normally closed in the absence of a gating signal applied thereto, means for supplying the said second component to the said channel, and means for supplying the said output pulses as a gating signal to the said channel.

6. A burst-separating system according to claim 5 wherein the said transmission channel comprises a control system adapted to open the said transmission channel in response to an input signal having an amplitude greater than a given value, means for combining the said output pulses with the said oscillatory bursts thereby to form a composite wave having an amplitude greater than the said given value, and means for supplying the said composite wave to the said control system.

7. A burst-separating system according to claim 5 wherein the said means for producing a control wave comprises a differentiating network and wherein the said means for supplying the said second component to the said transmission channel comprises a filter having a pass band including the said given frequency value of the said oscillatory bursts and substantially excluding the frequency values of the first component of the said color television wave.

8. A burst-separating system according to claim 5 wherein the said oscillatory network comprises an inductor and a capacitor connected in shunt relationship and having a resonant period substantially equal to twice the said back-porch interval, and wherein the said means for supplying the said output pulses as a gating signal comprises means intercoupling the said oscillatory network and the said transmission channel and adapted to limit the excursions of said output pulses to a given value greater than that required to gate open said channel.

9. A burst-separating system according to claim 5 wherein the said transmission channel comprises an input control system and an output system, the said input system being adapted to open the said transmission channel in response to an input signal having an amplitude greater than a given value, means for combining the said output pulses with the said oscillatory bursts thereby to form a composite wave having an amplitude greater than the said given value, means for supplying the said composite wave to the said input control system, and the said output system comprising an oscillatory network having a parallel-resonance at a frequency substantially equal to the said given frequency value of the said oscillatory bursts.

10. A burst-separating system responsive to a color television wave having first and second components, the said first component comprising time-spaced, periodically recurring, positive-going synchronizing pulses and the said second component comprising oscillatory bursts having a given frequency value and duration and recurring within a back-porch interval following each of the said synchronizing pulses, said system comprising means for deriving the said synchronizing pulses from the said color television wave, a differentiating circuit coupled to the said deriving means and adapted to produce a control signal in response to the trailing edge of the said synchronizing pulses, the said control signal having a value more negative than a given value during the said back-porch interval and less negative than the said given value substantially at the said control signal having a value more negative than a given value during the said back-porch interval and less negative than the said given value substantially at the expiration of the said back-porch interval, an electron discharge tube having a cathode, a control electrode and an anode, an oscillatory network comprising a first inductor and a first capacitor connected in shunt relationship and having a period substantially equal to twice the said back-porch interval, the said cathode being connected to a point at reference potential, the said anode being connected by the said oscillatory network to a source of a voltage positive with respect to said reference potential, the said control electrode being coupled to the said differentiating network, the cut-off potential of the said electron discharge tube being substantially equal to the said given value, means coupled to the said anode of the said electron discharge tube for limiting to a predetermined value the excursion of pulses supplied thereto with a given polarity, a normally-closed transmission channel which opens in response to a gating signal having said given polarity and a minimum value less than said predetermined value, means for coupling the said transmission channel to the said excursion-limiting means, and means for supplying the said second component to the said transmission channel.

11. A burst-separating system according to claim 10 wherein the said excursion-limiting means comprises a second capacitor and first and second resistance elements interconnected in series relationship between the said anode and the said cathode of the said electron discharge tube, a rectifier having an anode and a cathode, the said anode of the said rectifier being coupled to the interconnection of the said first and second resistance elements and the said cathode of the said rectifier being coupled to the said cathode of the said electron discharge tube, wherein the said transmission channel comprises a second electron discharge tube having a cathode, a control electrode and an anode, biasing means for operating the last-named cathode at a potential more positive than reference potential, means for coupling the last-named anode to the said source of positive voltage, a second oscillatory network comprising a second inductor and a third capacitor connected in shunt relationship and having a resonant frequency substantially equal to the said given frequency value of the said oscillatory bursts, and means for shunting the said second oscillatory network across the cathode-anode path of the said second electron discharge tube, and wherein the said means for supplying the said second component to the said transmission channel comprises a third inductor, a resistor and a fourth capacitor connected in series relationship, means for coupling one terminal of the said third inductor to the said rectifier anode, means for coupling the said control electrode of the said second electron discharge tube to the interconnection of the said resistor and the said fourth capacitor, and means for supplying the said color television wave to the said fourth capacitor and to the said means for deriving the said synchronizing pulses.

12. In a television receiver adapted to receive a composite television signal comprising a video signal, a blanking signal, a horizontal synchronizing signal, and an auxiliary synchronizing signal which occurs during said blanking signal and after said horizontal synchronizing signal; a picture signal reproducing tube, a video amplifier circuit conductively connected to said tube, means for impressing said television signal upon said amplifier, a synchronizing signal separator circuit for separating said horizontal synchronizing signal from the television signal, a synchronizing wave generator coupled to said signal separator circuit and responsive to the separated horizontal synchronizing signal to produce a wave having a predetermined parameter, said wave generator including a resonant circuit which when shock excited by said horizontal synchronizing signal produces a parameter timed to occur coincidentally with the occurrence of said auxiliary synchronizing signal, and a normally nonconductive circuit coupled to said wave generator responsive to said parameter to be conductive during the period of said parameter, said nonconductive circuit also being coupled to said amplifier circuit whereby said auxiliary synchronizing signal only will be conducted by said normally nonconductive circuit during the period of conduction caused by said parameter.

13. In a television receiver adapted to receive a composite television signal comprising a video signal, a blanking signal, a horizontal synchronizing signal, and an auxiliary synchronizing signal which occurs during said blanking signal and after said horizontal synchronizing signal; a picture signal reproducing tube, a video amplifier circuit conductively connected to said tube, means for impressing said television signal upon said amplifier, a synchronizing signal separator circuit for separating said horizontal synchronizing signal from the television signal, a synchronizing wave generator coupled to said signal separator circuit responsive to the separated horizontal synchronizing signal to produce a wave having a predetermined parameter, said generator including an inductance and a capacitor connected in parallel which when shock excited by said horizontal synchronizing signal produces a parameter timed to occur coincidentally with the occurrence of said auxiliary synchronizing signal, and a normally nonconductive circuit coupled to said wave generator responsive to said parameter to be conductive during the period of said parameter, said nonconductive circuit also being coupled to said amplifier circuit whereby said auxiliary synchronizing signal only will be conducted by said normally nonconductive circuit during the period of conduction caused by said parameter.

14. In a television receiver adapted to receive a composite television signal comprising a video signal, a blanking signal, a horizontal synchronizing signal, and an auxiliary synchronizing signal which occurs during said blanking signal and after said horizontal synchronizing signal; a picture signal reproducing tube, a video amplifier circuit conductively connected to said tube, means for impressing said television signal upon said amplifier, a synchronizing signal separator circuit for separating said horizontal synchronizing signal from the television signal, a synchronizing wave generator coupled to said signal separator circuit and responsive to the separated horizontal synchronizing signal to produce a wave having a predetermined parameter, said generator including an inductance and a capacitor connected in parallel which when shock excited by said horizontal synchronizing signal produces a parameter timed to occur coincidentally with the occurrence of said auxiliary synchronizing signal, and a normally nonconductive circuit coupled to said wave generator and including an electron discharge device having a control electrode which is normally biased to cut off, said parameter causing said electron discharge device to conduct during the period thereof, said normally nonconductive circuit being also coupled to said amplifier circuit whereby said auxiliary signal only will be conducted by said electron discharge device during the period of conduction caused by said parameter.

15. In a television receiver adapted to receive a composite television signal comprising a video signal, a blanking signal, a horizontal synchronizing signal, and an auxiliary synchronizing signal which occurs during said blanking signal and after said horizontal synchronizing signal, a picture signal reproducing tube, a video amplifier circuit conductively connected to said tube, means for impressing said television signal upon said amplifier, a synchronizing signal separator circuit for separating said horizontal synchronizing signal from the television signal, a synchronizing wave generator coupled to said signal separator circuit and responsive to the separated horizontal synchronizing signal to produce a wave having a predetermined parameter, said generator including an inductance and a capacitor connected in parallel which when shock excited by said horizontal synchronizing signal produces a parameter timed to occur coincidentally with the occurrence of said auxiliary synchronizing signal, and a normally nonconductive circuit coupled to said wave generator and including an electron discharge device having a control electrode which is normally biased to cut off, time constant means operatively coupled to said electron discharge device operative to provide the aforesaid bias, said parameter causing said electron discharge device to conduct during the period thereof, said normally nonconductive circuit also coupled to said amplifier circuit whereby said auxiliary signal only will be conducted by said electron discharge device during the period of conduction caused by said parameter.

16. In a television receiver adapted to receive a composite television signal comprising a video signal, a blanking signal, a horizontal synchronizing signal, and an auxiliary synchronizing signal which occurs during said blanking signal and after said horizontal synchronizing signal; first means for supplying said television signal, second means for separating said horizontal synchronizing signal from the television signal, a synchronizing wave generator coupled to said second means and responsive to the separated horizontal synchronizing signal to produce a wave having a predetermined parameter, said wave generator including a resonant circuit which when shock excited by said horizontal synchronizing signal produces a parameter timed to occur coincidentally with the occurrence of said auxiliary synchronizing signal, and a normally nonconductive circuit coupled to said wave generator responsive to said parameter to be conductive during the period of said parameter, said nonconductive circuit also being coupled to said first means whereby said auxiliary synchronizing signal only will be conducted by said normally nonconductive circuit during the period of conduction caused by said parameter.

References Cited in the file of this patent

UNITED STATES PATENTS

| | | |
|---|---|---|
| 2,586,957 | Keizer | Feb. 26, 1952 |
| 2,648,766 | Eberhard | Aug. 11, 1953 |
| 2,668,236 | McCoy | Feb. 2, 1954 |

UNITED STATES PATENT OFFICE

CERTIFICATION OF CORRECTION

Patent No. 2,905,748 September 22, 1959

Clem H. Phillips

It is hereby certified that error appears in the above numbered patent requiring correction and that the said Letters Patent should read as corrected below.

Column 3, line 24, for "marked" read -- marker --; column 4, line 55, for "26" read -- 22 --; column 8, lines 72 to 74, strike out -- said control signal having a value more negative than a given value during the said back-porch interval and less negative than the said given value substantially at the".

Signed and sealed this 25th day of July 1961.

(SEAL)
Attest:

ERNEST W. SWIDER
Attesting Officer

DAVID L. LADD
Commissioner of Patents